United States Patent
Park et al.

(10) Patent No.: US 11,752,804 B2
(45) Date of Patent: Sep. 12, 2023

(54) PNEUMATIC TIRE WITH REINFORCING PART

(71) Applicant: HANKOOK TIRE & TECHNOLOGY CO., LTD, Seongnam-si (KR)

(72) Inventors: Joo Bae Park, Daejeon (KR); Il Sik Kim, Daejeon (KR); Seung Hwan Rhee, Daejeon (KR)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 4 days.

(21) Appl. No.: 17/443,540

(22) Filed: Jul. 27, 2021

(65) Prior Publication Data

US 2022/0024256 A1    Jan. 27, 2022

(30) Foreign Application Priority Data

Jul. 27, 2020    (KR) ........................ 10-2020-0092982

(51) Int. Cl.
    *B60C 11/03*      (2006.01)
    *B60C 9/00*       (2006.01)

(52) U.S. Cl.
    CPC .. *B60C 11/0306* (2013.01); *B60C 2009/0071* (2013.01); *B60C 2011/0341* (2013.01)

(58) Field of Classification Search
    CPC .............. B60C 11/0309; B60C 11/042; B60C 11/0306; B60C 2011/1361; B60C 2011/0341

See application file for complete search history.

(56) References Cited

U.S. PATENT DOCUMENTS

| | | | | |
|---|---|---|---|---|
| 4,736,783 A | * | 4/1988 | Motomura | .......... B60C 11/1263 |
| | | | | 152/209.27 |
| 5,309,964 A | * | 5/1994 | Kogure | ............... B60C 11/0318 |
| | | | | 152/209.2 |

FOREIGN PATENT DOCUMENTS

| | | | | | |
|---|---|---|---|---|---|
| EP | | 1995081 A1 | * | 11/2008 | ......... B60C 11/0309 |
| JP | | H02155808 A | * | 6/1990 | ........... B60C 11/042 |
| JP | | 2005119614 A | * | 5/2005 | ............. B60C 11/04 |
| KR | | 0168612 B1 | | 1/1999 | |
| KR | 10-2010-0077308 A | | | 7/2010 | |

* cited by examiner

*Primary Examiner* — Justin R Fischer
*Assistant Examiner* — Philip N Schwartz
(74) *Attorney, Agent, or Firm* — Bridgeway IP Law Group, PLLC; Jihun Kim

(57) ABSTRACT

There is provided a pneumatic tire with a reinforcing part which is mounted on a tire wheel, the pneumatic tire including: a tread having a groove that is formed in a circumferential direction of the tire wheel as being recessed toward a central axis of the tire wheel, a kerf that is formed to intersect the groove as being recessed toward the central axis of the tire wheel, and one or more blocks that are formed between the groove and the kerf and come into contact with a road surface; a shoulder formed at a side of the tread; and a reinforcing part inserted into the groove formed between the one or more blocks. The reinforcing part reduces noise produced due to contact with the road surface by being bent one or more times.

12 Claims, 8 Drawing Sheets

PNEUMATIC TIRE WITH REINFORCING PART

BACKGROUND OF THE INVENTION

Field of the Invention

The present invention relates to a pneumatic tire with a reinforcing part, and more specifically, to a pneumatic tire with a reinforcing part in which the reinforcing part is inserted into a groove to reduce noise.

Description of the Related Art

In general, when a vehicle runs, a channel formed by a main groove in FIG. 1 causes a straight pipe-shaped air column having a uniform cross section to be formed, and thus pipe resonance occurs, resulting in a phenomenon of tire noise amplification.

FIG. 1 illustrates flow of hydroplaning due to running of the vehicle. As illustrated in FIG. 1, in a rainy weather, as a tread comes into contact with a road surface with rotation of a tire, water flows along a groove, and thus the groove has a function of preventing a slipping phenomenon on a road.

In this case, the pipe resonance constantly amplifies tire noise during running not only at a normal speed of 60 kph to 80 kph in the downtown area but also in a speed range of 100 kph to 130 kph on an expressway.

Examples of an existing technology to solve the pipe resonance phenomenon include methods of using a Helmholtz resonator or engraving a knurling shape additionally on a wall surface of a groove.

However, the Helmholtz resonator has design difficulties in accurately calculating and adding a cavity shape having a specific volume within a pattern.

However, since a knurling shape is engraved by performing accurate processing of a fine line shape on a wall surface of a groove, difficulty in a mold manufacturing process increases.

Hence, there is a demand for a technology for reducing tire noise, instead of methods of using the Helmholtz resonator or engraving a knurling shape in the related art.

CITATION LIST

Patent Literature

Patent Literature 1: Korean Unexamined Patent Publication No. 10-2010-0077308 (Jul. 8, 2010)
Patent Literature 2: Korean Patent Registration No. 10-0168612 (Oct. 2, 1998)

SUMMARY OF THE INVENTION

An object of the present invention to solve the above-described problems is to provide a pneumatic tire with a reinforcing part in which the reinforcing part bent one or more times is inserted into a groove formed between one or more blocks to realize a pipeline structure that brings about an expansion chamber effect in the groove, thereby reducing noise due to contact with a road surface.

Technical objects to be achieved by the present invention are not limited to the technical object mentioned above, and the following description enables other unmentioned technical objects to be clearly understood by a person of ordinary skill in the art to which the present invention pertains.

According to a configuration of the present invention to achieve the above-described object, there is provided a pneumatic tire with a reinforcing part which is mounted on a tire wheel, the pneumatic tire including: a tread having a groove that is formed in a circumferential direction of the tire wheel as being recessed toward a central axis of the tire wheel, a kerf that is formed to intersect the groove as being recessed toward the central axis of the tire wheel, and one or more blocks that are formed between the groove and the kerf and come into contact with a road surface; a shoulder formed at a side of the tread; and a reinforcing part inserted into the groove formed between the one or more blocks. The reinforcing part reduces noise produced due to contact with the road surface by being bent one or more times.

According to an embodiment of the present invention, the reinforcing part may have a thickness of 2 mm to 3 mm.

According to the embodiment of the present invention, the reinforcing part may have an SS rib, an M rib, an LL rib, an S rib, and an L rib which are each extended by a predetermined length in opposite directions from both ends of a right-angled 'C' shape, and the SS rib, the M rib, the LL rib, the S rib, and the L rib may be different from each other in size and are connected to each other in series.

According to the embodiment of the present invention, the SS rib, the M rib, the LL rib, the S rib, and the L rib may alternately project to be opposite to each other with a central axis as a reference.

According to the embodiment of the present invention, the SS rib may have: a first SS rib which has at least one portion positioned on the same straight line as the central axis and is bent at an angle of 90° once; a second SS rib which is extended from one end of the first SS rib and is parallel to the central axis; and a third SS rib which has at least one portion positioned on the same straight line as the central axis, is bent at an angle of 90° once, and is connected to one end of the second SS rib. The first SS rib and the third SS rib may have the same shape, and at least the one portion of the first SS rib and at least the one portion of the third SS rib may be extended outward to be opposite to each other.

According to the embodiment of the present invention, the M rib may have: a first M rib which has at least one portion positioned on the same straight line as the central axis and is bent at an angle of 90° once; a second M rib which is extended from one end of the first M rib and is parallel to the central axis; and a third M rib which has at least one portion positioned on the same straight line as the central axis, is bent at an angle of 90° once, and is connected to one end of the second M rib. The first M rib and the third M rib may have the same shape, and at least the one portion of the first M rib and at least the one portion of the third M rib may be extended outward to be opposite to each other.

According to the embodiment of the present invention, the LL rib may have: a first LL rib which has at least one portion positioned on the same straight line as the central axis and is bent at an angle of 90° once; a second LL rib which is extended from one end of the first LL rib and is parallel to the central axis; and a third LL rib which has at least one portion positioned on the same straight line as the central axis, is bent at an angle of 90° once, and is connected to one end of the second LL rib. The first LL rib and the third LL rib may have the same shape, and at least the one portion of the first LL rib and at least the one portion of the third LL rib may be extended outward to be opposite to each other.

According to the embodiment of the present invention, the S rib may have: a first S rib which has at least one portion positioned on the same straight line as the central axis and is bent at an angle of 90° once; a second S rib which is extended from one end of the first S rib and is parallel to the central axis; and a third S rib which has at least one portion positioned on the same straight line as the central axis, is bent at an angle of 90° once, and is connected to one end of the second S rib. The first S rib and the third S rib may have the same shape, and at least the one portion of the first S rib and at least the one portion of the third S rib may be extended outward to be opposite to each other.

According to the embodiment of the present invention, the L rib may have: a first L rib which has at least one portion positioned on the same straight line as the central axis and is bent at an angle of 90° once; a second L rib which is extended from one end of the first L rib and is parallel to the central axis; and a third L rib which has at least one portion positioned on the same straight line as the central axis, is bent at an angle of 90° once, and is connected to one end of the second L rib. The first L rib and the third L rib may have the same shape, and at least the one portion of the first L rib and at least the one portion of the third L rib may be extended outward to be opposite to each other.

According to the embodiment of the present invention, a pitch length (Lp) representing the shortest distance between both ends of the SS rib may be 25 mm, a width (W) representing a length perpendicular to at least the one portion of the SS rib may be 2 mm, and a ratio (H/Lp) obtained by dividing a length (H) of the second SS rib by the pitch length (Lp) may be 58%.

According to the embodiment of the present invention, a pitch length (Lp) representing the shortest distance between both ends of the M rib may be 31.825 mm, a width (W) representing a length perpendicular to at least the one portion of the M rib may be 3 mm, and a ratio (H/Lp) obtained by dividing a length (H) of the second M rib by the pitch length (Lp) may be 54%.

According to the embodiment of the present invention, a pitch length (Lp) representing the shortest distance between both ends of the LL rib may be 40.5 mm, a width (W) representing a length perpendicular to at least the one portion of the LL rib may be 4 mm, and a ratio (H/Lp) obtained by dividing a length (H) of the second LL rib by the pitch length (Lp) may be 50%.

According to the embodiment of the present invention, a pitch length (Lp) representing the shortest distance between both ends of the S rib may be 28.25 mm, a width (W) representing a length perpendicular to at least the one portion of the S rib may be 2 mm, and a ratio (H/Lp) obtained by dividing a length (H) of the second S rib by the pitch length (Lp) may be 56%.

According to the embodiment of the present invention, a pitch length (Lp) representing the shortest distance between both ends of the L rib may be 35.925 mm, a width (W) representing a length perpendicular to at least the one portion of the L rib may be 3 mm, and a ratio (H/Lp) obtained by dividing a length (H) of the second L rib by the pitch length (Lp) may be 52%.

DETAILED DESCRIPTION OF THE PREFERRED EMBODIMENTS

Hereinafter, the present invention is to be described with reference to the accompanying drawings. However, the present invention can be realized as various different examples and thus is not limited to embodiments described here. Besides, a part unrelated to the description is omitted from the drawings in order to clearly describe the present invention, and similar reference signs are assigned to similar parts through the entire specification.

In the entire specification, a case where a certain part is "connected to (attached to, in contact with, or coupled to)" another part means not only a case where the parts are "directly connected" to each other, but also a case where the parts are "indirectly connected" to each other with still another member interposed therebetween. In addition, a case where a certain part "comprises" a certain configurational element does not mean that another configurational element is excluded but means that the other configurational element can be further included, unless specifically described otherwise.

Terms used in this specification are only used to describe a specific embodiment and are not intentionally used to limit the present invention thereto. A singular form of a word also includes a plural meaning of the word, unless obviously implied otherwise in context. In this specification, words such as "to comprise" or "to include" are understood to specify that a feature, a number, a step, an operation, a configurational element, a member, or a combination thereof described in the specification is present and not to exclude presence or a possibility of addition of one or more other features, numbers, steps, operations, configurational elements, members, or combinations thereof in advance.

Hereinafter, the embodiments of the present invention will be described in detail with reference to the accompanying drawings.

Figure 1:
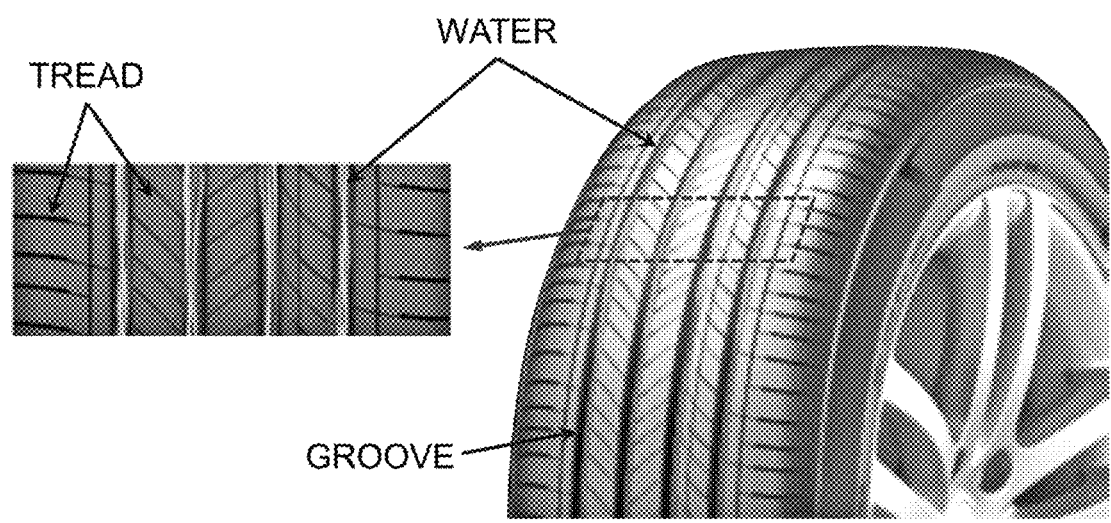
FIG. 1 is a perspective view in one direction illustrating flow of water on a pneumatic tire with a reinforcing part according to the related art.
Figure 2:
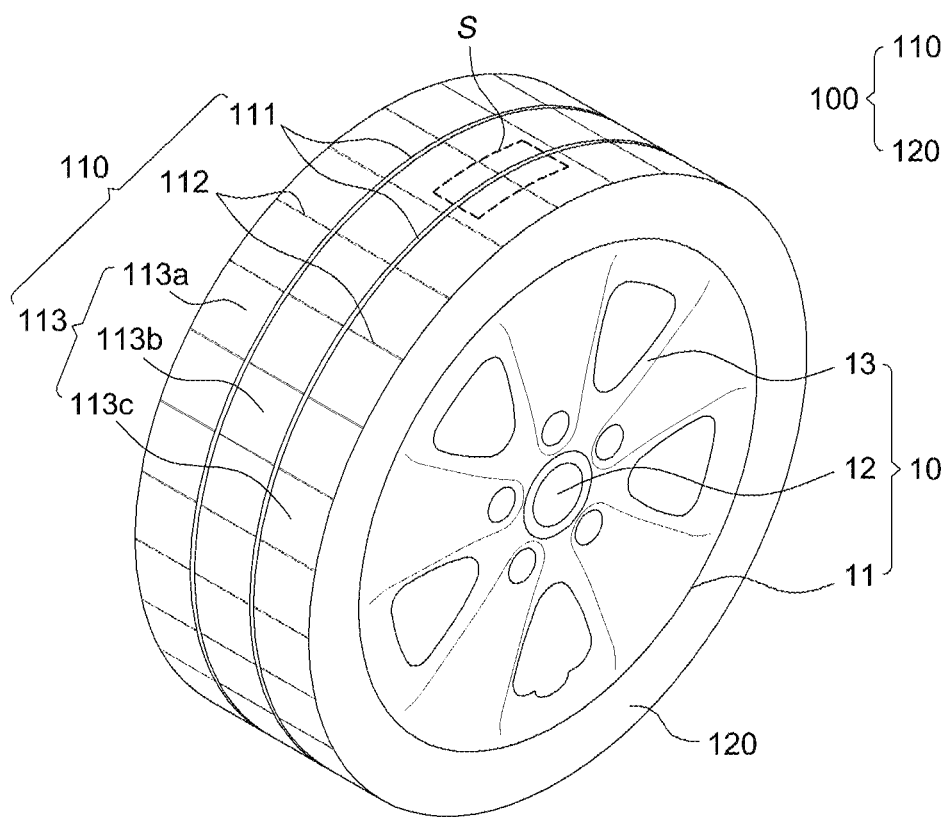
FIG. 2 is a perspective view in one direction illustrating a pneumatic tire with a reinforcing part according to an embodiment of the present invention.

FIG. 2 is a perspective view in one direction illustrating a pneumatic tire with a reinforcing part according to an embodiment of the present invention.

A tire wheel 10, on which a pneumatic tire 100 with a reinforcing part is mounted, is first described, before description of the pneumatic tire 100 with a reinforcing part according to the embodiment of the present invention.

With reference to FIG. 2, the tire wheel 10 is an apparatus on which the pneumatic tire 100 with a reinforcing part is mounted and includes a rim 11, a disc 12, and a spoke 13.

Desirably, the rim 11 has a cylindrical shape with both sides opened and is made of a material having a predetermined strength so as to support a load of a vehicle. One or more spokes 13 are coupled to an inner surface of the rim 11 to be separated by a predetermined distance from the inner surface.

Desirably, the disc 12 is positioned at a central portion within the rim 11 and is made of a material having a predetermined strength so as to support a load of a vehicle. One or more spokes 13 are coupled to an outer surface of the disc 12 to be separated by a predetermined distance from the outer surface.

The spoke 13 is a configurational element which connects the rim 11 and the disc 12, and one or more spokes are configured to be made of a material having a predetermined strength, thereby transmitting a load of a vehicle to the disc 12.

Hereinafter, the pneumatic tire 100 with a reinforcing part according to the embodiment of the present invention is to be described with reference to FIGS. 2 to 8.

According to the pneumatic tire with a reinforcing part which is mounted on a tire wheel, the pneumatic tire 100 with a reinforcing part according to the embodiment of the present invention includes a tread 110, a shoulder 120, and a reinforcing part 130.

The tread 110 includes a groove 111, a kerf 112, and a block 113.

A groove 111 is formed in a circumferential direction of the tire wheel 10 as being recessed toward a central axis of the tire wheel 10. In FIG. 2, two grooves 111 are illustrated; however, the number of grooves is not limited thereto.

The groove 111 fulfills a function of effectively draining water flowing into the groove in a rainy weather while a vehicle runs on a road.

The kerf 112 is a groove formed to intersect the groove 111 as being recessed toward the central axis of the tire wheel 10. In FIG. 2, 36 kerfs 112 are illustrated; however, the number of kerfs is not limited thereto.

The reinforcing part 130 is inserted into the kerf 112.

The block 113 includes one or more blocks that are formed between the grooves 111 and the kerfs 112 and that come into contact with a road surface.

Here, the one or more blocks 113 means first blocks 113a, second blocks 113b, and third blocks 113c. In the present invention, the first blocks 113a are blocks positioned in the leftmost row in FIG. 2, the second blocks 113b are blocks positioned in the middle row in FIG. 2, and the third blocks 113c are blocks positioned in the rightmost row in FIG. 2.

In FIG. 2, the one or more blocks 113 are illustrated as 39 blocks; however, the number of blocks is not limited thereto.

The shoulder 120 is formed at a side of the tread 110 and comes into close contact with the rim 11, thereby fixing the tread 110 to the rim 11.

The reinforcing part 130 is inserted into the groove 111 formed between the one or more blocks 113. In this manner, the reinforcing part 130 is bent one or more times, thereby reducing noise produced due to contact with a road surface.

Figure 3:
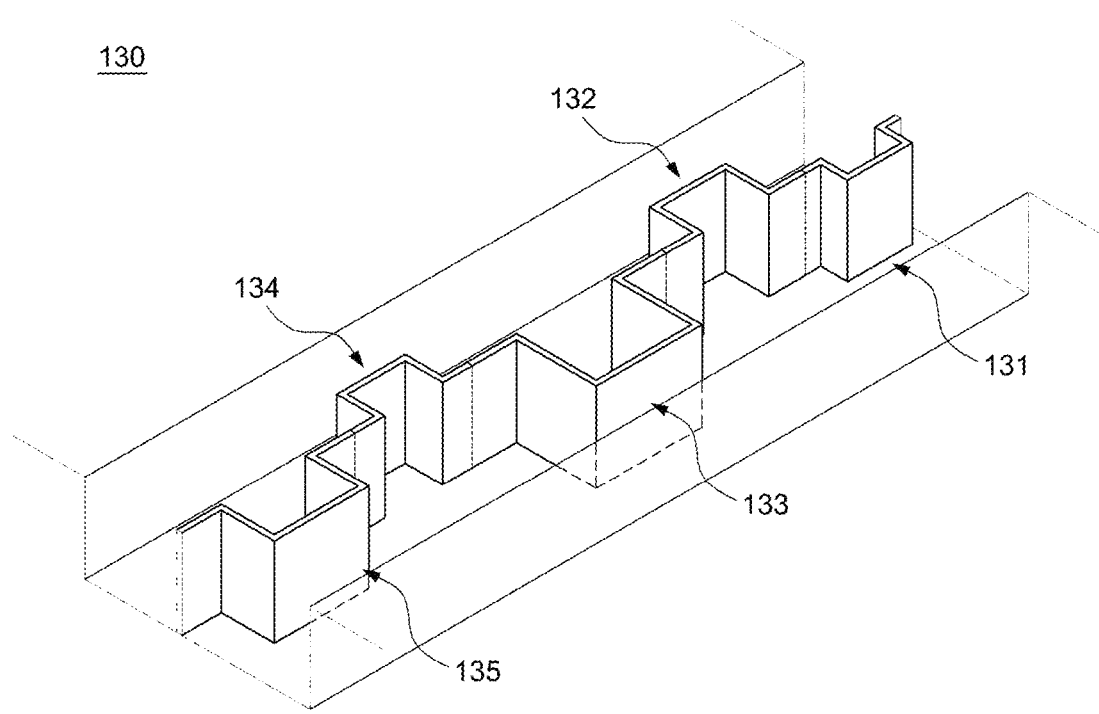
FIG. 3 is a partially enlarged view illustrating details of region S in FIG. 2.
Figure 4:
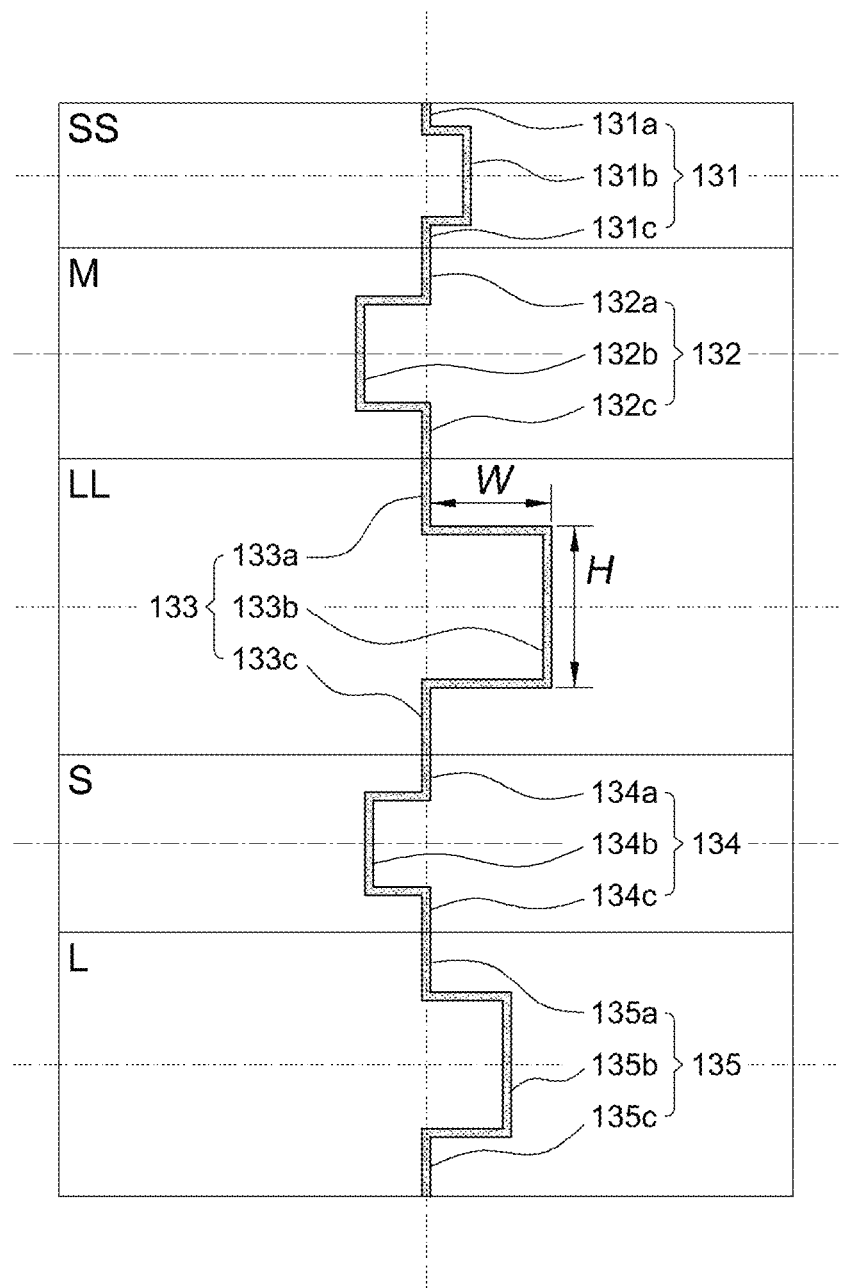
FIG. 4 is a plan view in one direction illustrating a reinforcing part in FIG. 3.

FIG. 3 is a partially enlarged view illustrating details of region S in FIG. 2. FIG. 4 is a plan view in one direction illustrating the reinforcing part in FIG. 3.

With reference to FIGS. 3 and 4, the reinforcing part 130 can be bent eight times, but can be bent more times or less times as necessary.

In addition, the reinforcing part 130 has a thickness of 2 mm to 3 mm, desirably.

The reinforcing part 130 has an SS rib 131, an M rib 132, an LL rib 133, an S rib 134, and an L rib 135 which are each extended by a predetermined length in opposite directions from both ends of a right-angled 'C' shape.

In addition, the SS rib 131, the M rib 132, the LL rib 133, the S rib 134, and the L rib 135 are different from each other in size and are connected to each other in series.

In addition, the SS rib 131, the M rib 132, the LL rib 133, the S rib 134, and the L rib 135 alternately project to be opposite to each other with a central axis as a reference.

The SS rib 131 has a first SS rib 131a, a second SS rib 131b, and a third SS rib 131c.

With reference to FIG. 4, the first SS rib 131a has a plate shape which has at least one portion positioned on the same straight line as the central axis and is bent at an angle of 90° once. Here, the central axis is a dash-dotted line formed in a vertical direction.

Specifically, the first SS rib 131a is an 'L'-shaped plate member, and one end of one portion perpendicular to at least the one portion of the first SS rib 131a is perpendicularly connected to the second SS rib 131b.

The second SS rib 131b is a plate member which is extended from the one end of the first SS rib 131a and is parallel to the central axis. In addition, the second SS rib 131b is positioned to project toward a right-hand side with the central axis as a reference.

In addition, one end of the second SS rib 131b is connected to the third SS rib 131c.

The third SS rib 131c has a plate shape which has at least one portion positioned on the same straight line as the central axis, is bent at an angle of 90° once, and is connected to the one end of the second SS rib 131b.

In this case, the first SS rib 131a and the third SS rib 131c have the same shape and are positioned to be opposite to each other.

More specifically, at least the one portion of the first SS rib 131a and at least the one portion of the third SS rib 131c are extended outward to be opposite to each other.

That is, with reference to FIG. 4, at least the one portion of the first SS rib 131a is positioned to be extended upward, and at least the one portion of the third SS rib 131c is positioned to be extended downward.

The M rib 132 has a first M rib 132a, a second M rib 132b, and a third M rib 132c.

The first M rib 132a has a plate shape which has at least one portion positioned on the same straight line as the central axis and is bent at an angle of 90° once.

Specifically, the first M rib 132a is an 'L'-shaped plate member, and one end of one portion perpendicular to at least the one portion of the first M rib 132a is perpendicularly connected to the second M rib 132b.

The second M rib 132b is a plate member which is extended from the one end of the first M rib 132a and is parallel to the central axis. In addition, the second M rib 132b is positioned to project toward a left-hand side with the central axis as a reference.

In addition, one end of the second M rib 132b is connected to the third M rib 132c.

The third M rib 132c is a plate member which has at least one portion positioned on the same straight line as the central axis, is bent at an angle of 90° once, and is connected to the one end of the second M rib 132b.

In this case, the first M rib 132a and the third M rib 132c have the same shape and are positioned to be opposite to each other.

More specifically, at least the one portion of the first M rib 132a and at least the one portion of the third M rib 132c are extended outward to be opposite to each other.

That is, with reference to FIG. 4, at least the one portion of the first M rib 132a is positioned to be extended upward, and at least the one portion of the third M rib 132c is positioned to be extended downward.

The LL rib 133 has a first LL rib 133a, a second LL rib 133b, and a third LL rib 133c.

The first LL rib 133a has a plate shape which has at least one portion positioned on the same straight line as the central axis and is bent at an angle of 90° once.

Specifically, the first LL rib 133a is an 'L'-shaped plate member, and one end of one portion perpendicular to at least the one portion of the first LL rib 133a is perpendicularly connected to the second LL rib 133b.

The second LL rib 133b is a plate member which is extended from the one end of the first LL rib 133a and is parallel to the central axis. In addition, the second LL rib 133b is positioned to project toward the right-hand side with the central axis as a reference.

In addition, one end of the second LL rib 133b is connected to the third LL rib 133c.

The third LL rib 133c is a plate member which has at least one portion positioned on the same straight line as the central axis, is bent at an angle of 90° once, and is connected to the one end of the second LL rib 133b.

In addition, the first LL rib 133a and the third LL rib 133c have the same shape and are positioned to be opposite to each other.

More specifically, at least the one portion of the first LL rib 133a and at least the one portion of the third LL rib 133c are extended outward to be opposite to each other.

That is, with reference to FIG. 4, at least the one portion of the first LL rib 133a is positioned to be extended upward, and at least the one portion of the third LL rib 133c is positioned to be extended downward.

The S rib 134 has a first S rib 134a, a second S rib 134b, and a third S rib 134c.

The first S rib 134a has a plate shape which has at least one portion positioned on the same straight line as the central axis and is bent at an angle of 90° once.

The second S rib 134b is a plate member which is extended from one end of the first S rib 134a and is parallel to the central axis. In addition, the second S rib 134b is positioned to project toward the left-hand side with the central axis as a reference.

In addition, one end of the second S rib 134b is connected to the third S rib 134c.

The third S rib 134c is a plate member which has at least one portion positioned on the same straight line as the central axis, is bent at an angle of 90° once, and is connected to the one end of the second S rib 134b.

In addition, the first S rib 134a and the third S rib 134c have the same shape and are positioned to be opposite to each other.

More specifically, at least the one portion of the first S rib 134a and at least the one portion of the third S rib 134c are extended outward to be opposite to each other.

That is, with reference to FIG. 4, at least the one portion of the first S rib 134a is positioned to be extended upward, and at least the one portion of the third S rib 134c is positioned to be extended downward.

The L rib 135 has a first L rib 135a, a second L rib 135b, and a third L rib 135c.

The first L rib 135a has a plate shape which has at least one portion positioned on the same straight line as the central axis and is bent at an angle of 90° once.

The second L rib 135b is a plate member which is extended from one end of the first L rib 135a and is parallel to the central axis. In addition, the second L rib 135b is positioned to project toward the left-hand side with the central axis as a reference.

In addition, one end of the second L rib 135b is connected to the third L rib 135c, but the second L rib and the third L rib are positioned to be opposite to each other.

More specifically, at least the one portion of the first L rib 135a and at least the one portion of the third L rib 135c are extended outward to be opposite to each other.

That is, with reference to FIG. 4, at least the one portion of the first L rib 135a is positioned to be extended upward, and at least the one portion of the third L rib 135c is positioned to be extended downward.

The third L rib 135c is a plate member which has at least one portion positioned on the same straight line as the central axis, is bent at an angle of 90° once, and is connected to the one end of the second L rib 135b.

In this case, the first L rib 135a and the third L rib 135c have the same shape, and at least the one portion of the first L rib 135a and at least the one portion of the third L rib 135c are extended outward to be opposite to each other.

The above-described reinforcing part 130 is inserted in the groove 111, thereby bringing about an expansion chamber effect.

In this case, a height H of the reinforcing part 130 illustrated in FIG. 4 is designed to be equal to a depth of the groove 111. In addition, the reinforcing part 130 has a shape designed by determining sizes of H and W for each step as illustrated in FIG. 4.

In this manner, the reinforcing part 130 brings about an expansion chamber effect of a discontinuous change in cross section within the groove 111. The expansion chamber effect enables the reinforcing part 130 to function as a noise reducing element which inhibits noise in a footprint from being propagated outside.

The discontinuous change in cross-sectional area inhibits an air column having a uniform cross section from being formed at the tread during rotation of a tire and prevents an occurrence of pipe resonance due to the air column.

In addition, addition of the reinforcing part 130 causes a ground contact ratio with a road surface and a hydroplaning breakage characteristic to be increased. Hence, degradation of hydroplaning characteristics due to a decrease in effective cross-sectional area of a channel of the groove 111 is compensated.

Hence, when the reinforcing part 130 is applied to a snow tire, an effective edge line which comes into contact with a ground surface is increased, and thus performance of a snow tractive force or snow traction is increased.

In this respect, the reinforcing part 130 can be designed to have a width W and a height H which vary depending on a pattern, that is, the first, second, and third blocks (113a, 113b, and 113c) of a tire, and details thereof are provided in Tables 1 and 2.

TABLE 1

Samples (Three Pitches)

| Pitch Type | Pitch Length (Lp)(mm) | Width (W)(mm) | H/Lp(%) |
|---|---|---|---|
| L | 40 | +3 | 50 |
| M | 33 | −3 | 54 |
| S | 27 | −2 | 58 |

In Table 1, when three blocks illustrated in FIG. 4 are formed (three pitches), a width W and a ratio (H/Lp) of a height H to a pitch length Lp of the reinforcing part 130 are provided, and the width W is described to be minus (−) when being present at the left-hand side and plus (+) when being present at the right-hand side, based on at least the one portion of at least the one portion of the first M rib 132a, at least the one portion of the third M rib 132c, at least the one portion of the first S rib 134a, at least the one portion of the third S rib 134c, at least the one portion of the first L rib 135a, at least the one portion of the third L rib 135c which are illustrated in FIG. 4.

TABLE 2

Samples (Five Pitches)

| Pitch Type | Pitch Length (Lp)(mm) | Width (W)(mm) | H/Lp(%) |
|---|---|---|---|
| LL | 40.5 | 4 | 50 |
| L | 35.925 | 3 | 52 |
| M | 31.825 | −3 | 54 |
| S | 28.2 | −2 | 56 |
| SS | 25 | 2 | 58 |

In Table 2, when five blocks are formed (five pitches), a width W and a ratio (H/Lp) of a height H to a pitch length Lp of the reinforcing part 130 are provided, and the width W is described to be minus (−) when being present at the left-hand side and plus (+) when being present at the right-hand side, based on at least the one portion of the first SS rib 131a, at least the one portion of the third SS rib 131c, at least the one portion of the first M rib 132a, at least the one portion of the third M rib 132c, at least the one portion of the first LL rib 133a, at least the one portion of the third LL rib 133c, at least the one portion of the first S rib 134a, at least the one portion of the third S rib 134c, at least the one portion of the first L rib 135a, at least the one portion of the third L rib 135c which are illustrated in FIG. 4. First, a pitch length Lp representing the shortest distance between both ends of the SS rib 131 is 25 mm, a width W representing a length perpendicular to at least the one portion of the SS rib 131 is 2 mm, and a ratio (H/Lp) obtained by dividing a length H of the second SS rib 131b by the pitch length Lp is 58%.

Next, a pitch length Lp representing the shortest distance between both ends of the M rib 132 is 31.825 mm, a width W representing a length perpendicular to at least the one portion of the M rib 132 is 3 mm, and a ratio (H/Lp) obtained by dividing a length H of the second M rib 132b by the pitch length Lp is 54%.

Next, a pitch length Lp representing the shortest distance between both ends of the LL rib 133 is 40.5 mm, a width W representing a length perpendicular to at least the one portion of the LL rib 133 is 4 mm, and a ratio (H/Lp) obtained by dividing a length H of the second LL rib 133b by the pitch length Lp is 50%.

Next, a pitch length Lp representing the shortest distance between both ends of the S rib 134 is 28.25 mm, a width W representing a length perpendicular to at least the one portion of the S rib 134 is 2 mm, and a ratio (H/Lp) obtained by dividing a length H of the second S rib 134b by the pitch length Lp is 56%.

Lastly, a pitch length Lp representing the shortest distance between both ends of the L rib 135 is 35.925 mm, a width W representing a length perpendicular to at least the one portion of the L rib 135 is 3 mm, and a ratio (H/Lp) obtained by dividing a length H of the second L rib 135b by the pitch length Lp is 52%.

In this case, a height of the reinforcing part 130 is designed to reach 90% of a depth of the groove 111.

In addition, the reinforcing part 130 has a shape designed by determining the width W and the length H for each pitch as illustrated in FIG. 4 and Tables 1 and 2.

The reinforcing part 130 disposed in a perimeter direction which is a circumferential direction of the tire wheel 10 is designed for each pitch of a pitch sequence of a tire pattern and minimizes the occurrence of noise due to the reinforcing part 130. As a result, the number of steps of length change of the reinforcing part 130 in the perimeter direction is equal to the number of pattern pitches.

In addition, a size of W representing a change in length in a lateral direction of a tire is determined not to exceed 25% of the groove 111 as a maximum value W, regarding a relative priority between hydroplaning performance and noise performance.

Figure 5A:
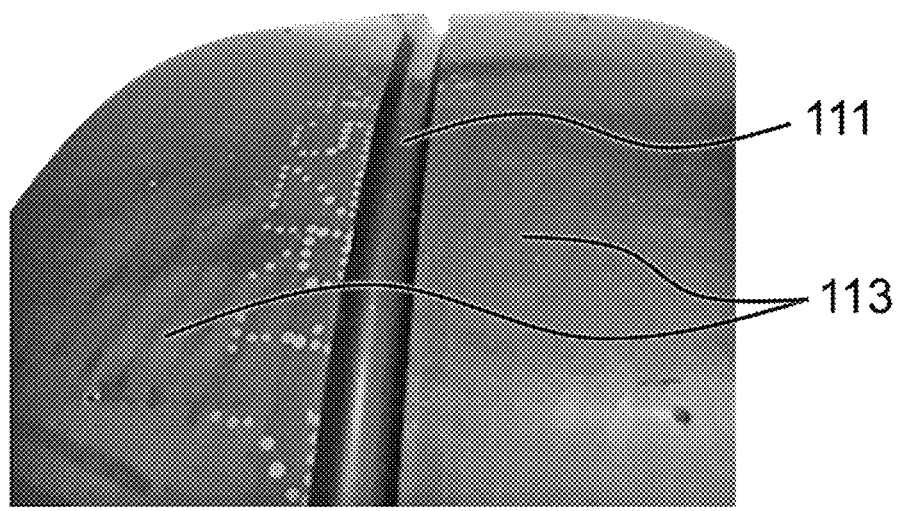
FIGS. 5A and 5B are partial-perspective views illustrating an actually manufactured pneumatic tire with a reinforcing part according to the embodiment of the present invention.
Figure 5B:
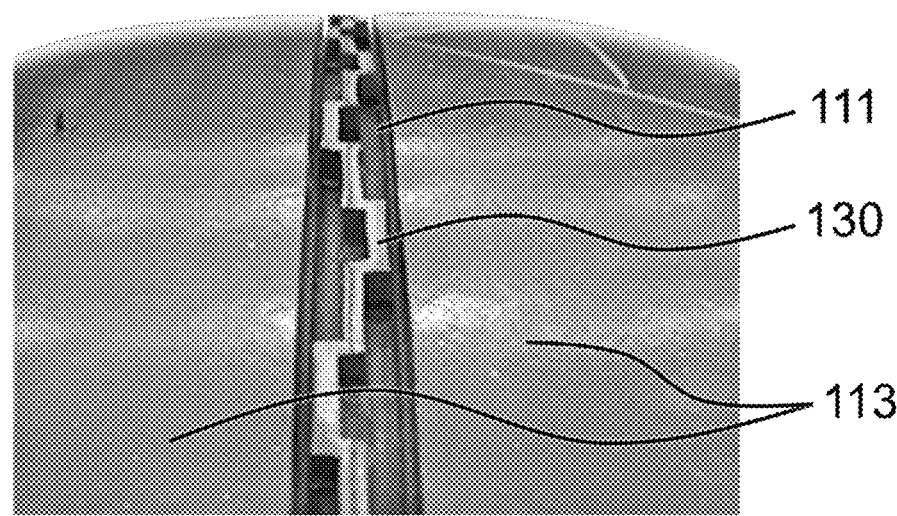

FIGS. 5A and 5B are partial-perspective views illustrating an actually manufactured pneumatic tire with a reinforcing part according to the embodiment of the present invention and illustrate a manufactured carving tire.

FIG. 5A illustrates a carving tire, and FIG. 5B illustrates the carving tire in FIG. 5A with a reinforcing part. In this case, the carving tire is a tire manufactured according to the present invention.

In this case, a width W of the groove 111 is 15 mm, a depth of the groove 111 is 7 mm, a thickness of the reinforcing part 130 is 2 mm to 3 mm.

Figure 6:
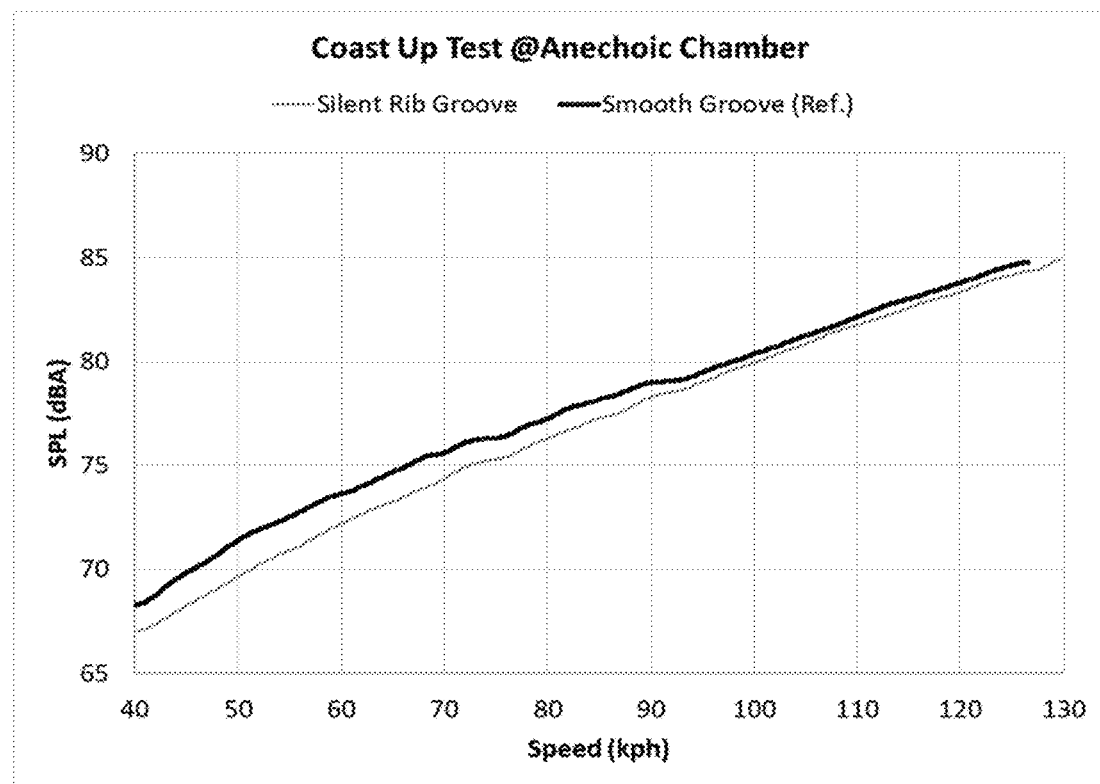
FIG. 6 is a graph of an experiment illustrating noise depending on a speed of the pneumatic tire with a reinforcing part according to the embodiment of the present invention and the related art in an anechoic chamber.

FIG. 6 is a graph of an experiment illustrating noise depending on a speed of the pneumatic tire with a reinforcing part according to the embodiment of the present invention and the related art in an anechoic chamber, and the graph illustrates a result obtained by the carving tire with a reinforcing part illustrated in FIG. 5B.

In this case, the groove 111 of the present invention is a silent rib groove, and the groove in the related art is a smooth groove.

FIG. 6 enables to check that less noise is produced by the groove 111 of the present invention than by the groove in the related art at a speed in an entire zone in which the tire rotates. Hence, the present invention can be accepted to be effective in reducing noise.

Figure 7:
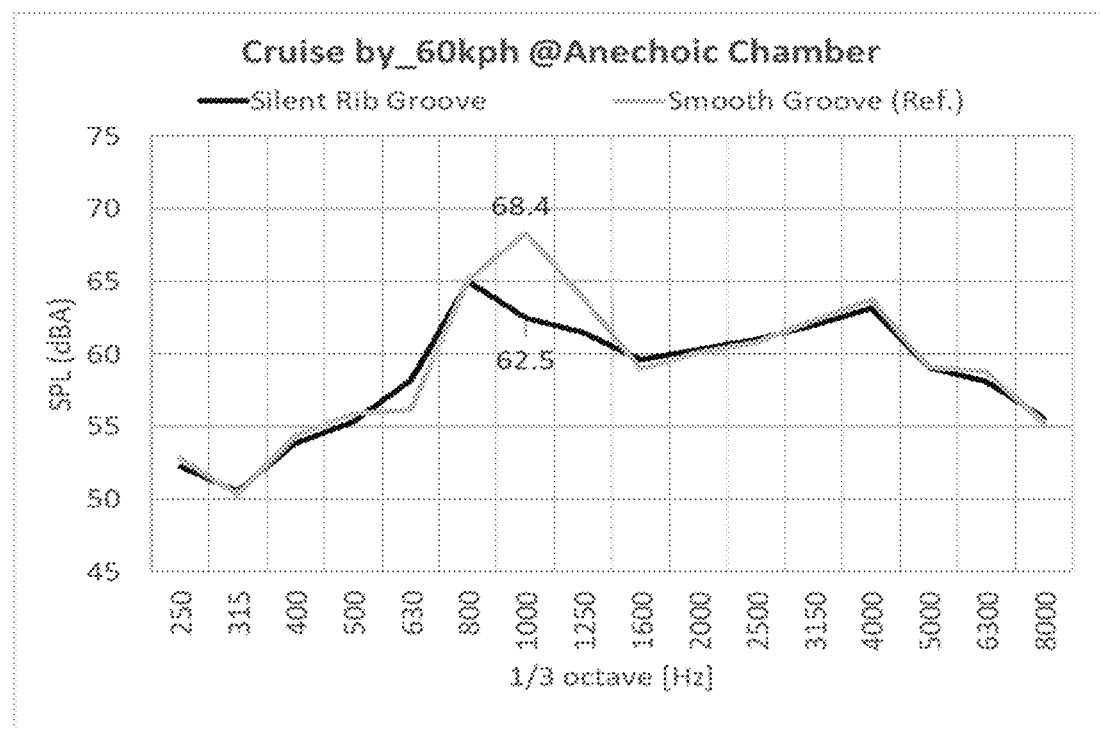
FIG. 7 is a graph of an experiment illustrating noise depending on an octave of the pneumatic tire with a reinforcing part according to the embodiment of the present invention and the related art in an anechoic chamber (60 kph)

FIG. 7 is a graph of an experiment illustrating noise depending on an octave of the pneumatic tire with a reinforcing part according to the embodiment of the present invention and the related art in an anechoic chamber (60 kph), and the graph illustrates a result obtained by the carving tire with a reinforcing part illustrated in FIG. 5A. The experiment is conducted under a condition in which cruising is performed at a speed of 60 kps in the anechoic chamber.

FIG. 7 enables to check that less noise is produced by the groove 111 of the present invention than by the groove in the related art in most of an entire zone of one third of an octave.

Figure 8:
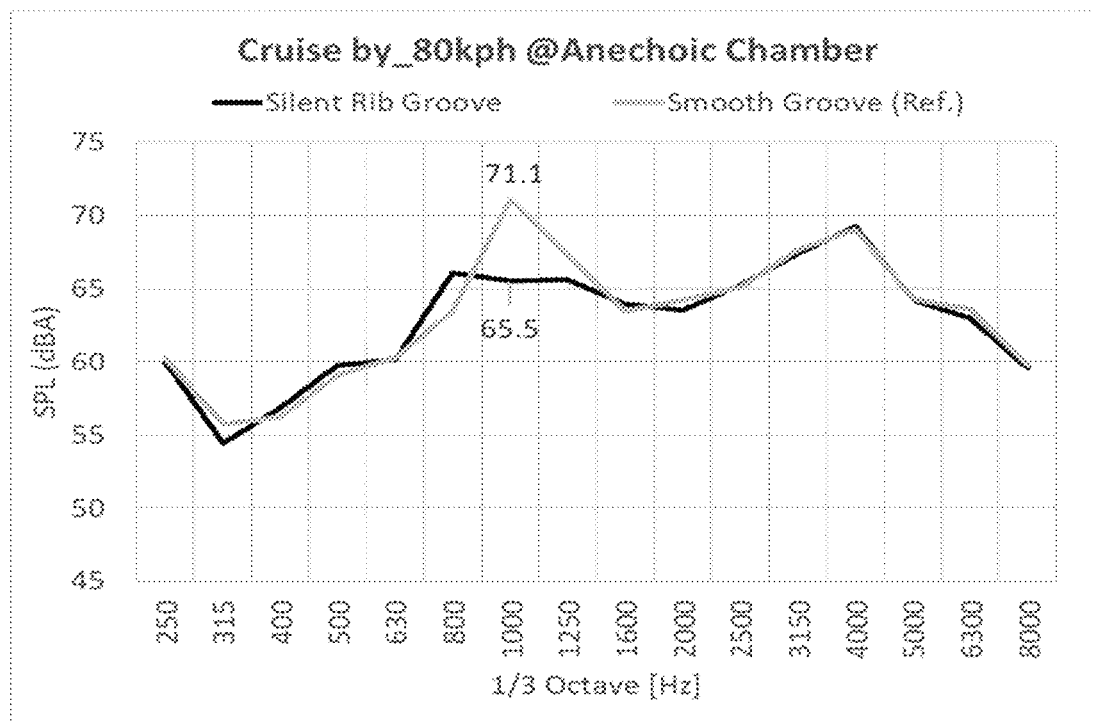
FIG. 8 is a graph of an experiment illustrating noise depending on an octave of the pneumatic tire with a reinforcing part according to the embodiment of the present invention and the related art in an anechoic chamber (80 kph).

FIG. 8 is a graph of an experiment illustrating noise depending on an octave of the pneumatic tire with a reinforcing part according to the embodiment of the present invention and the related art, in an anechoic chamber (80 kph). The experiment is conducted under a condition in which cruising is performed at a speed of 80 kps in the anechoic chamber.

Similarly to FIG. 7, FIG. 8 enables to check that less noise is produced by the groove 111 of the present invention than by the groove in the related art, in most of the entire zone of one third of an octave.

Effects of the present invention according to the above-described configuration include not only a reduction in noise produced due to contact with a road surface but also prevention of an air column phenomenon by inserting a reinforcing part which is bent one or more times into a groove formed between one or more blocks and by realizing a pipeline structure that brings about an expansion chamber effect in the groove.

In addition, another effect of the present invention according to the above-described configuration include compensation for a degradation phenomenon of hydroplaning characteristics due to a decrease in effective cross-sectional area of a groove channel as a ground contact ratio and a hydroplaning breakage characteristic are increased due to addition of a reinforcing part.

Effects of the present invention are to be construed not to be limited to the above-described effects but to include any effect that can be derived from configurations of the present invention described in the detailed description of the preferred embodiment and claims of the present invention.

The description of the present invention described above is provided as an example, and a person of ordinary skill in the art to which the present invention pertains can understand that it is possible to easily modify the present invention to another embodiment without changing the technical idea or essential feature of the present invention. Therefore, the embodiments described above are to be understood only as examples in every aspect and not as examples limiting the present invention. For example, the configurational elements described in a singular form can be realized in a distributed manner. Similarly, the configurational elements described in a distributed manner can be realized in a combined manner.

The scope of the present invention has to be represented by the claims to be described below, and meaning and the scope of the claims and every modification or modified embodiment derived from an equivalent concept of the claims have to be construed to be included in the scope of the present invention.

While the present invention has been described with respect to the specific embodiments, it will be apparent to those skilled in the art that various changes and modifications may be made without departing from the spirit and scope of the present invention as defined in the following claims.

What is claimed is:

1. A pneumatic tire configured to be mounted on a tire wheel, the pneumatic tire comprising:
a tread having a groove that is formed in a circumferential direction of the tire wheel as being recessed toward a central axis of the pneumatic tire, and a kerf that is formed to intersect the groove as being recessed toward the central axis of the pneumatic tire; and
a reinforcing part configured to be inserted into the groove,
wherein the reinforcing part is bent one or more times and has discontinuous change in cross-sectional area thereof, which inhibits an air column having a uniform cross section from being formed at the tread during rotation of the pneumatic tire and prevents an occurrence of pipe resonance due to the air column,
wherein the reinforcing part has an SS rib, an M rib, an LL rib, an S rib, and an L rib, each extending by a predetermined length in opposite directions from both ends of a right-angled 'C' shape, and
wherein the SS rib, the M rib, the LL rib, the S rib, and the L rib are different from each other in size and are connected to each other in series.

2. The pneumatic tire with a reinforcing part according to claim 1,
wherein the SS rib, the M rib, the LL rib, the S rib, and the L rib alternately project to be opposite to each other with a central reference axis.

3. The pneumatic tire according to claim 2,
wherein the SS rib includes, when the central reference axis is defined along the circumferential direction of the tire wheel:
a first SS rib which has at least one portion positioned on a same straight line as the central reference axis and is bent at an angle of 90° once;
a second SS rib which extends from one end of the first SS rib and is parallel to the central reference axis; and
a third SS rib which has at least one portion positioned on the same straight line as the central reference axis, is bent at an angle of 90° once, and is connected to one end of the second SS rib,
wherein the first SS rib and the third SS rib have a same shape, and
wherein the at least one portion of the first SS rib and the at least one portion of the third SS rib extend outward to be opposite to each other.

4. The pneumatic tire according to claim 3,
wherein the M rib includes:
a first M rib which has at least one portion positioned on the same straight line as the central reference axis and is bent at an angle of 90° once;
a second M rib which extends from one end of the first M rib and is parallel to the central reference axis; and
a third M rib which has at least one portion positioned on the same straight line as the central reference axis, is bent at an angle of 90° once, and is connected to one end of the second M rib,
wherein the first M rib and the third M rib have the same shape, and
wherein the at least one portion of the first M rib and the at least one portion of the third M rib extend outward to be opposite to each other.

5. The pneumatic tire according to claim 4,
wherein the LL rib includes:
a first LL rib which has at least one portion positioned on the same straight line as the central reference axis and is bent at an angle of 90° once;
a second LL rib which extends from one end of the first LL rib and is parallel to the central reference axis; and
a third LL rib which has at least one portion positioned on the same straight line as the central reference axis, is bent at an angle of 90° once, and is connected to one end of the second LL rib,
wherein the first LL rib and the third LL rib have the same shape, and
wherein the at least one portion of the first LL rib and the at least one portion of the third LL rib extend outward to be opposite to each other.

6. The pneumatic tire according to claim 5,
wherein the S rib includes:
a first S rib which has at least one portion positioned on the same straight line as the central reference axis and is bent at an angle of 90° once;
a second S rib which extends from one end of the first S rib and is parallel to the central reference axis; and
a third S rib which has at least one portion positioned on the same straight line as the central reference axis, is bent at an angle of 90° once, and is connected to one end of the second S rib, wherein the first S rib and the third S rib have the same shape, and wherein the at least one portion of the first S rib and the at least one portion of the third S rib extend outward to be opposite to each other.

7. The pneumatic tire according to claim 6, wherein the L rib includes:

a first L rib which has at least one portion positioned on the same straight line as the central reference axis and is bent at an angle of 90° once;

a second L rib which extends from one end of the first L rib and is parallel to the central reference axis; and a third L rib which has at least one portion positioned on the same straight line as the central reference axis, is bent at an angle of 90° once, and is connected to one end of the second L rib, wherein the first L rib and the third L rib have the same shape, and wherein the at least one portion of the first L rib and the at least one portion of the third L rib extend outward to be opposite to each other.

8. The pneumatic tire according to claim 3, wherein a pitch length (Lp) representing the shortest distance between both ends of the SS rib is 25 mm, wherein a width (W) representing a length perpendicular to at least the one portion of the SS rib is 2 mm, and wherein a ratio (H/Lp) obtained by dividing a length (H) of the second SS rib by the pitch length (Lp) is 58%.

9. The pneumatic tire according to claim 4, wherein a pitch length (Lp) representing the shortest distance between both ends of the M rib is 31.825 mm, wherein a width (W) representing a length perpendicular to at least the one portion of the M rib is 3 mm, and wherein a ratio (H/Lp) obtained by dividing a length (H) of the second M rib by the pitch length (Lp) is 54%.

10. The pneumatic tire according to claim 5, wherein a pitch length (Lp) representing the shortest distance between both ends of the LL rib is 40.5 mm, wherein a width (W) representing a length perpendicular to at least the one portion of the LL rib is 4 mm, and wherein a ratio (H/Lp) obtained by dividing a length (H) of the second LL rib by the pitch length (Lp) is 50%.

11. The pneumatic tire according to claim 6, wherein a pitch length (Lp) representing the shortest distance between both ends of the S rib is 28.25 mm, wherein a width (W) representing a length perpendicular to at least the one portion of the S rib is 2 mm, and wherein a ratio (H/Lp) obtained by dividing a length (H) of the second S rib by the pitch length (Lp) is 56%.

12. The pneumatic tire according to claim 7, wherein a pitch length (Lp) representing the shortest distance between both ends of the L rib is 35.925 mm, wherein a width (W) representing a length perpendicular to at least the one portion of the L rib is 3 mm, and wherein a ratio (H/Lp) obtained by dividing a length (H) of the second L rib by the pitch length (Lp) is 52%.

\* \* \* \* \*